April 30, 1963 M. LUBIN 3,087,838

METHODS OF PHOTOELECTRIC CELL MANUFACTURE

Original Filed Oct. 5, 1955

INVENTOR
MARVIN LUBIN

Stauch, Nolan & Neale
ATTORNEYS

United States Patent Office 3,087,838

Patented Apr. 30, 1963

3,087,838

METHODS OF PHOTOELECTRIC CELL MANUFACTURE

Marvin Lubin, La Grange, Ill., assignor to Hupp Corporation, Cleveland, Ohio, a corporation of Virginia Original application Oct. 5, 1955, Ser. No. 538,573. Divided and this application Apr. 24, 1959, Ser. No. 808,816

7 Claims. (Cl. 117—213)

This invention relates to photoelectric cells and more particularly to improved methods of manufacture thereof. This is a division of my copending application Serial No. 538,573, filed October 5, 1955, now abandoned.

There has long existed in the photoelectric control art a widespread and insistent demand for photocells providing photo-signal outputs of magnitude sufficient to directly actuate relays and like control elements without need for signal amplifiers, capacitor type accumulators or other such auxiliary circuit elements. Photoemission and photovoltaic type sensitive elements are incapable of providing signal outputs of this magnitude, and photoconductive elements as heretofore constructed also are incapable of doing so at least in units of reasonable size and cost.

Signal output currents in the conventional photoconductive type sensitive elements may be increased to some extent by increasing the applied voltage, though in many cases the increase in output current does not increase linearly with increased voltage and in all cases the current increase thus obtainable is definitely limited by the ability of the photosensitive element either to tolerate or to dissipate the heat generated due to electrical power consumed therein. Particularly in the case of point contact type sensitive elements, this problem has in many prior constructions been aggravated by concentration of current flow and consequent localization of heat in the relatively small areas of electrode contact typical of these prior photoelements. In other previous constructions current carrying capacity has been limited by fixed resistance in the contacts and by the high internal resistance of prior photosensitive elements even when under illumination.

The ideal photoconductive element for high current applications thus should have (1) very high dark resistance for minimum power consumption when not under illuminations; (2) large resistance change under illumination (i.e., high photosensitivity) so as to have very low resistance when illuminated, to thus provide maximum photo-signal amplitude and at the same time minimize electrical power consumption in the photoelement; (3) minimum contact and other fixed resistance, for this same purpose; and (4) the ability to tolerate or dissipate whatever heat may be generated in the element.

Patent No. 2,890,939 to Ravich discloses methods and means for producing crystallitic photoconductor elements of materials such as cadmium sulfide, which satisfy certain of the conditions of and approach the ideal just outlined. Thus, photocrystals produced in accordance with the basic methods of said copending application and improvements thereon provide very high dark resistance and high photo-signal output even in crystals of very small size. They also are characterized by low coefficient of resistance change with temperature, good linearity of response and uniformity of response characteristics from crystal to crystal.

It is the primary purpose and object of the present invention to provide new and improved photocells embodying photoconductive elements preferably of cadmium sulfide such as disclosed in the aforesaid pending application, and including novel electrode and mounting structures providing substantially increased usable photo-signal output, greater current carrying capacity, better heat control and dissipation, and also wider versatility of use as will be more fully explained hereinafter.

In accordance with the invention, the problem of excessive heat within the photocell is solved and high signal output currents obtained by elimination of insulating barriers at the photoelement contact surfaces, provision of large area low resistance electrical connections and photoelement mounting structures capable of conducting away and dissipating any heat generated. In the photocells of the invention utilizing cadmium sulfide crystals as photosensitive elements, it is readily possible to obtain output currents of 150 milliamps. and higher, as compared to the 10 milliamps heretofore considered maximum for these crystals and to the even lower maximum currents obtainable with prior photoconductors of other types. It also is readily possible to safely dissipate up to 3 watts and as much as 11 watts for short periods of time even in crystals of relatively small size, while maximum power dissipation in such prior units has been about 0.3 watt.

A further advantage of photocells provided with large area electrodes in accordance with the invention is their adaptability to use other than as photoconductors, the cells being adaptable to other uses such as photodiodes and photovoltaic elements by application of their electrodes in particular manner as fully disclosed hereinafter. The photoelements of the invention also may be used as photocapacitors in A.C. detector circuits.

Accordingly, it is an important object of the invention to provide new and improved photoelements comprising crystalline semiconductor materials which are ion bombardment cleaned in vacuum and provided with plated metal electrodes by metal evaporation in the same vacuum, whereby large area low resistance electrode connections to the semiconductor are produced free of the insulating barriers commonly found at the surfaces of such materials.

A further object of the invention is the provision of novel methods for application of electrodes to crystals of semiconductor materials such as cadmium sulfide, including the steps of ion bombarding the crystal surfaces by glow discharge in vacuum and, in the same vacuum, evaporating a metal such as gold, silver, aluminum or indium onto the crystal surfaces thus cleaned to form electrodes thereon.

Another object of the invention is the provision of cadmium sulfide and like semiconductor crystals with plated metal electrodes deposited in vacuum over surfaces of the crystals which previously have been ion bombardment cleaned so as to at least partially remove the insulating barriers normally found at these surfaces.

More specifically, it is an object to provide such semiconductor crystals wherein the opposed crystal surfaces to which the electrodes are applied are either only partially ion bombardment cleaned or are unequally cleaned so as to provide photodiode and photovoltaic effects.

It is also an object to provide novel plastic encapsulated photocrystals wherein undesirable reaction between the crystal and surrounding plastic is minimized by large area metal electrodes plated onto opposed surfaces of the crystal.

These and other objects, features and advantages of the invention will become more fully apparent by reference to the appended claims and the following detailed description when read in conjunction with the accompanying drawings wherein:

Figures 1, 2, 3, 4:
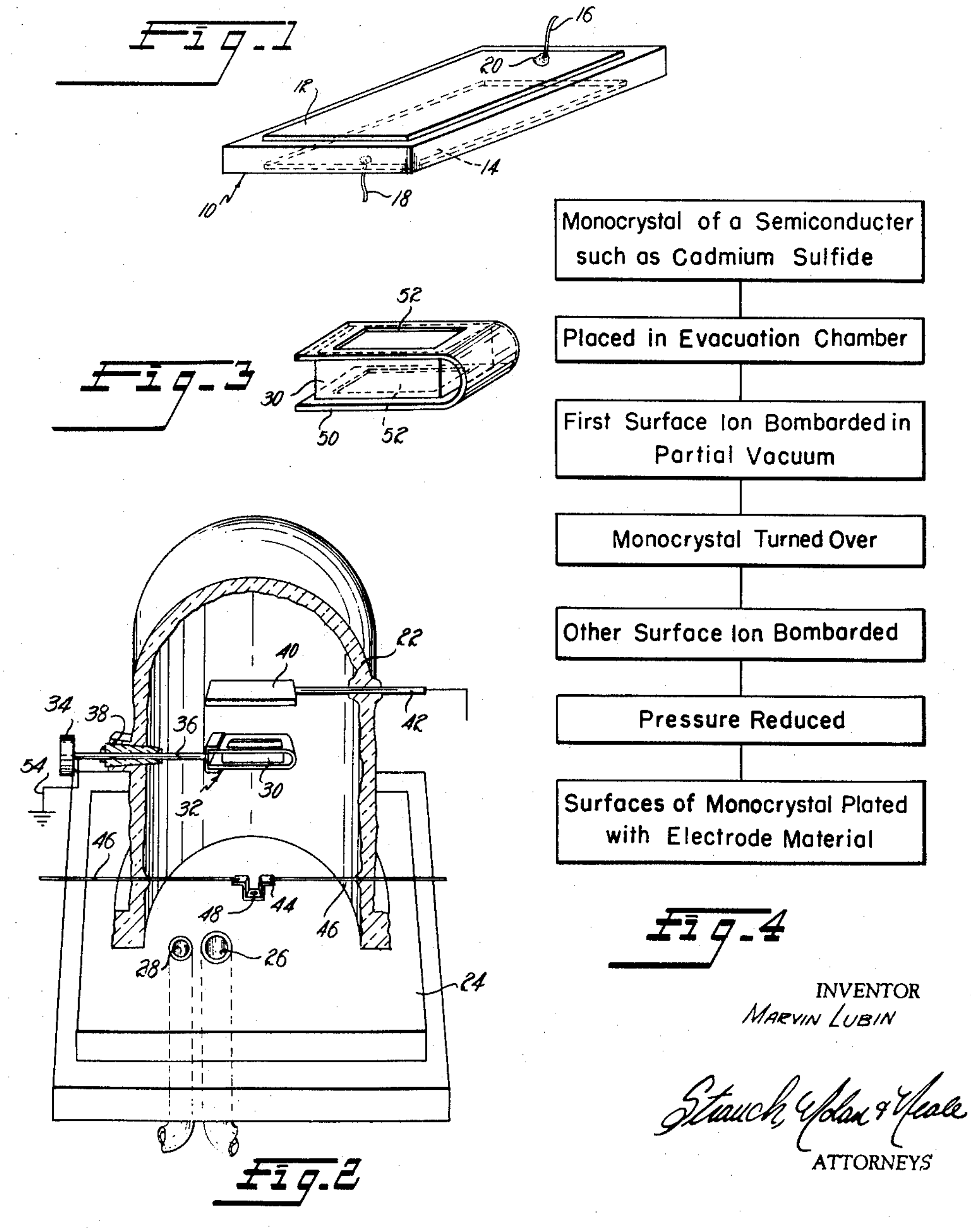
FIGURE 1 is a perspective view of a photocrystal provided with large area electrodes in accordance with the invention.
FIGURE 2 illustrates diagrammatically a simple form of apparatus suitable for cleaning crystal surfaces and forming electrodes thereon by methods of the invention.
FIGURE 3 is an enlarged detail view of a crystal and mask assembly as used in the vacuum apparatus of FIGURE 2.
FIGURE 4 is a diagram of the process in accordance with the present invention.

With continued reference to the drawings, wherein like reference numerals are used throughout to designate like elements, the photocrystal designated generally by reference numeral 10 in FIGURE 1 comprises a small single crystal or body of a photosensitive semiconductor material having electrodes 12 and 14 disposed on opposite sides thereof, the two electrodes covering substantially the entire areas of the crystal surfaces to which applied and having electrical leads 16 and 18 connected thereto preferably by electrically conductive cement as indicated at 20 in FIGURE 1.

As noted above, crystal 10 preferably is of cadmium sulfide grown in single crystal form by the basic methods of the aforesaid Ravich application and improvements thereon, though cadmium sulfide crystals produced by other methods also may be used. In many of its aspects the invention also is applicable to other photosensitive semiconductors such, for example, as germanium and silicon, but cadmium sulfide single crystals are preferred because of their much greater sensitivity and other important advantages enumerated above. Cadmium sulfide crystals of this type generally range in size from a few sq. mm. to several sq. cm. in area and usually range from a few tenths of a millimeter to several millimeters in thickness.

In accordance with the invention, the photoelement 10 of FIGURE 1 is produced in steps, as illustrated in the flow diagram of FIGURE 4, of thoroughly cleaning the crystal of the high resistance surface barrier normally found on untreated surfaces of such crystals and believed due to adsorbed gases and other impurities, this cleaning operation being effected by ion bombardment in vacuum. Then, in the same vacuum, a metal such as gold, silver or indium is flashed or otherwise vaporized onto the surfaces thus cleaned to form electrodes thereon providing electrical connection to the crystal. Both these operations may be carried out in a single vacuum chamber of the type commonly used in plating electrodes onto piezoelectric crystals. A very simple form of such apparatus is schematically illustrated in FIGURE 2, to which reference will now be made.

In FIGURE 2, a bell jar 22 and a base plate 24 on which it seals together define a vacuum chamber from which the atmosphere may be evacuated through an exhaust line 26 to roughing and holding vacuum pumps (not shown). If desired, an inlet line 28 also may be provided for flushing the chamber with a selected gas or vapor prior to the cleaning and plating operations to be described.

Within the vacuum chamber, the photocrystal blank 30 is mounted in a mask and holder assembly 32 more fully described hereinafter with reference to FIGURE 3, this assembly being manually or automatically rotatable by suitable means 34 fixed to the outer end of a mounting stem 36 sealed in the bell jar wall as by seal 38. A plate or other electrode 40 is mounted above the mask and holder assembly and is provided with an electrical lead 42 to the exterior of the bell jar. Below the mask and holder assembly, a strip or filament type heating element 44 is mounted between and electrically connected to a pair of lead wires 46 which extend to the exterior of the bell jar for connection across a battery or other electrical current source (not shown), which should be capable of passing sufficient current through the heater element 44 to raise it to a temperature adequate to vaporize gold, silver or other electrode material 48 placed in or on the heater element as shown.

As best shown in FIGURE 3, the photocrystal blank 30 is folded in or otherwise covered by a mask 50 having cut-outs 52 in opposite sides thereof so as to expose all but the peripheral portions of the crystal for electrode application. The size and shape of the cut-out areas of mask 50 preferably are selected to fit the particular crystal being treated, and also to suit the specific application for which it is intended.

The cleaning and electrode plating operations are carried out sequentially, preferably in steps of selecting a properly matched crystal and mask, inserting them in holder assembly 32 and adjusting handle 34 so as to place one exposed face of the crystal substantially normal to the path from electrode 40 as illustrated in FIGURE 2, and then connecting the roughing pump to evacuate the bell jar. Pressure within the bell jar preferably is first reduced to between 0.05 and 0.1 millimeter, and on reaching this pressure a glow discharge between crystal 30 and electrode 40 is initiated by grounding the crystal and its holder assembly as indicated at 54 (FIGURE 2) and applying a high alternating voltage from a Tesla coil, preferably about 10 to 14 thousand volts, to the lead wire 42 of electrode 40. The residual gas ions thus are accelerated toward and impinge upon the exposed upper surface of the crystal, where they have the effect of reducing or eliminating the surface insulating barrier which is characteristic of the untreated crystals and which probably is due to the presence of adsorbed gases. The length of time during which ion bombardment is continued depends on the particular application for which the crystal is intended; for certain uses as hereinafter explained the presence of a strong barrier layer on at least one side of the crystals is highly desirable, as in photovoltaic and photodiode units, for example. In general, a glow discharge continued for about 10 minutes is effective to completely or substantially remove the surface barrier.

After ion bombardment of one side of the crystal is completed, it is turned by rotation of holder stem 36 so as to transfer the glow discharge to the opposite side of the crystal. Ion bombardment then is continued until the surface barrier on the second crystal surface has been reduced in desired degree, which may be either a longer or a shorter period than on the first surface depending on the use for which the crystal is intended.

On completion of the cleaning operation, the glow discharge voltage is disconnected, the roughing pump is closed off and, without breaking the vacuum in the bell jar, the holding pump is connected to further reduce bell jar pressure preferably to between 0.05 and 0.1 micron.

With pressure held between these approximate limits, heater element leads 46 are connected to a current source to raise the temperature of the heater element 44 sufficiently to vaporize the gold, silver or other electrode metal previously placed thereon, onto the downwardly facing surface of crystal 30. This electrode deposition operation is continued until the electrode has built up to desired thickness, whereupon the crystal and its mount are rotated by handle 34 and plating continued on the other face of the crystal. When electrodes of desired thickness have been built up on both sides of the crystal, current flow through heater 44 is cut off, the vacuum in the bell jar is broken and the finished crystal removed therefrom.

Electrode thickness will vary with the specific application in which the crystal is to be used, but in general at least one of the electrodes must be sufficiently thin to have relatively good transparency to incident radiation. If the crystal is to be subjected to incident light on only one side, it usually is preferred to make the other electrode relatively thicker because of the greater mechanical strength afforded by the extra electrode thickness. This is by no means essential, however, and if desired both electrodes may be made very thin and transparent.

Gold, silver, aluminum and a number of other metals may successfully be used as the electrode material, gold being preferred because it has good transparency in the green portion of the spectrum, to which cadmium sulfide has maximum photosensitivity. The electrode metal may initially be in wire, strip or other conveniently measurable form, and if desired two separate heater elements 44 (FIGURE 2) may be used, one for each side of the crystal, to permit use of different metals for the two electrodes and to provide more accurate control of thickness of the individual electrodes.

Electrical connection to the electrodes may be made by lead wires or other suitable conductor elements electrically and mechanically connected to the electrodes preferably by indium solder, or by a conductive cement as indicated at 20 in FIGURE 1, the cement used being being a Hanovia silver paste, silver dispersed in Bakelite, or other suitable cement of conductive type.

As noted above, the voltages or times of glow discharge on opposite sides of the crystal may be reduced or made dissimilar to each other in order to obtain photovoltaic or photodiode characteristics in the finished unit, the surface insulating barrier being maintained intact or partially intact on at least one side of the crystal by reducing the voltage or time of ion bombardment thereof or omitting surface treatment on this one side altogether. The electrodes then are applied in the same manner as before and, due to the partially intact insulating barrier and asymmetry of surface bombardment, the finished photoelement will display photovoltaic and photodiode properties fitting such element to many applications other than as photoconductors.

Crystals having both surfaces similarly treated during the glow discharge operation also find uses other than as photoconductors, one such other use being as a photosensitive capacitor in A.C. type radiant energy measuring and detecting circuits as disclosed in the copending application of Kallmann et al., identified supra.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In the method of producing a photoelement, a process for increasing the current carrying capacity of the photoelement comprising the steps of ion bombarding at least one surface of a monocrystalline body of photosensitive cadmium sulfide in vacuum for a time period sufficient to remove absorbed gas and other surface impurities, and then in the same vacuum vaporizing electrode metal onto the monocrystalline body surface thus bombarded.

2. The method defined in claim 2 wherein electrode metal is vaporized onto opposed surfaces of said cadmium sulfide monocrystal body after said surfaces have been treated by ion bombardment.

3. In the method of producing a photoelement, a process for increasing the current carrying capacity of the photoelement comprising the steps of placing a monocrystalline body of photosensitive cadmium sulfide within a closed vessel containing an electrode connected to an external source of high potential and metal vaporization means in spaced relation to the body of cadmium sulfide, evacuating the vessel, accelerating residual gas ions in the evacuated vessel onto at least one surface of said body by glow discharge induced by application of voltage between said electrode and said body, removing such applied voltage and, while maintaining the vessel evacuated, actuating said metal vaporization means to plate spaced metallic electrodes onto said body.

4. The method defined in claim 3 wherein said vessel is evacuated to about 0.05 to 0.1 millimeter of mercury during said glow discharge step and to about 0.05 to 0.1 micron of mercury during said metal vaporization step.

5. In the method of producing a photoelement, a process for increasing the current carrying capacity of the photoelement comprising the steps of placing a monocrystalline body of cadmium sulfide within a closed vessel containing a large area electrode connected to a source of high potential alternating current and metal vaporization means in spaced relation to the body of cadmium sulfide, evacuating said vessel, applying said alternating current to terminals connected to said large area electrode and said body, then removing said applied current and further evacuating said vessel to a lower pressure without breaking said vacuum, and then actuating said metal vaporization means to plate spaced metallic electrodes onto said body.

6. In the method of producing an electrical circuit element, a process for increasing the current carrying capacity of the photoelement comprising the steps of placing a monocrystalline body of semiconductor material within a closed vessel containing an electrode connected to an external source of high potential and metal vaporization means in spaced relation to the body of semiconductor material, evacuating the vessel, accelerating residual gas ions in the evacuated vessel onto at least one surface of said body by glow discharge induced by application of voltage between said electrode and said body, removing such applied voltage and, while maintaining the vessel evacuated, actuating said metal vaporization means to plate spaced metallic electrodes onto said body.

7. In the method of producing an electrical circuit element, a process for increasing the current carrying capacity of the photoelement comprising the steps of placing a monocrystalline body of cadmium sulfide within a closed vessel containing a large area electrode connected to a source of high potential alternating current and metal vaporization means in spaced relation to the body of cadmium sulfide, evacuating said vessel, applying said alternating current to terminals connected to said large area electrode and said body, then removing said applied current and further evacuating said vessel to a lower pressure without breaking said vacuum, and then actuating said metal vaporization means to plate spaced metallic electrodes onto said body.

References Cited in the file of this patent

UNITED STATES PATENTS

| | | |
|---|---|---|
| 2,688,564 | Forgue | Sept. 7, 1954 |
| 2,765,385 | Thomsen | Oct. 2, 1956 |
| 2,765,765 | Bigler et al. | Oct. 9, 1956 |
| 2,799,600 | Scott | July 16, 1957 |
| 2,877,338 | Berge | Mar. 10, 1959 |
| 2,884,507 | Czipott | Apr. 28, 1959 |
| 2,930,106 | Wrotnowski | Mar. 29, 1960 |